US009143380B2

(12) United States Patent
Wikman

(10) Patent No.: US 9,143,380 B2
(45) Date of Patent: Sep. 22, 2015

(54) SYSTEM AND METHOD FOR THIRD PARTY SPECIFIED GENERATION OF WEB SERVER CONTENT

(75) Inventor: Johan Wikman, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1067 days.

(21) Appl. No.: 10/913,024

(22) Filed: Aug. 6, 2004

(65) Prior Publication Data

US 2006/0031428 A1 Feb. 9, 2006

(51) Int. Cl.
G06F 15/177 (2006.01)
H04L 29/06 (2006.01)
H04L 29/08 (2006.01)
H04M 1/725 (2006.01)

(52) U.S. Cl.
CPC ............ *H04L 29/06* (2013.01); *H04L 67/02* (2013.01); *H04L 67/04* (2013.01); *H04L 67/34* (2013.01); *H04M 1/72525* (2013.01); *H04M 1/72561* (2013.01)

(58) Field of Classification Search
USPC ......... 709/218, 221, 220, 227, 203, 245, 217; 709/229; 370/338, 328, 270, 329; 455/566, 455/3.05, 41.2, 411, 466, 502, 427, 186.1, 455/418, 412, 419; 719/315; 345/660; 717/173; 707/103 R, 100; 705/26
See application file for complete search history.

(56) References Cited

U.S. PATENT DOCUMENTS

| | | | |
|---|---|---|---|
| 5,742,845 A | 4/1998 | Wagner | |
| 5,778,367 A | 7/1998 | Wesinger et al. | |
| 5,956,487 A * | 9/1999 | Venkatraman et al. | 709/218 |
| 5,961,645 A | 10/1999 | Baker | |
| 6,018,774 A | 1/2000 | Mayle et al. | |
| 6,029,196 A * | 2/2000 | Lenz | 709/221 |
| 6,076,166 A * | 6/2000 | Moshfeghi et al. | 726/4 |
| 6,131,067 A | 10/2000 | Girerd et al. | |
| 6,212,556 B1 | 4/2001 | Arunachalam | |
| 6,292,833 B1 * | 9/2001 | Liao et al. | 709/229 |
| 6,519,241 B1 * | 2/2003 | Theimer | 370/338 |
| 6,519,568 B1 | 2/2003 | Harvey et al. | |
| 6,583,807 B2 | 6/2003 | Chang et al. | |
| 6,587,882 B1 | 7/2003 | Inoue et al. | |
| 6,647,001 B1 | 11/2003 | Bhagavath et al. | |
| 6,704,295 B1 | 3/2004 | Tari et al. | |

(Continued)

FOREIGN PATENT DOCUMENTS

GB      WO 03/034735      * 4/2003      ......... 7/173

OTHER PUBLICATIONS

Kehr, How to turn a GSM SIM into a web server, 2000.*

(Continued)

*Primary Examiner* — Vincelas Louis
(74) *Attorney, Agent, or Firm* — Ditthavong & Steiner, P.C.

(57) ABSTRACT

A mobile terminal may either receive a script, or request to receive a script, which specifies a third party procedure to generate content on the mobile terminal. The script defines the procedure, manual or automatic, to be used for the content generation. If manual content generation is required, then the user of the mobile terminal is queried for the content to be generated through an input procedure as directed by the script. If automatic content generation is required, then the script executes without user interaction to generate the content. In either case, the generated content is then readily accessible from the mobile terminal via a location within the WEB site name space as directed by the script.

23 Claims, 6 Drawing Sheets

(56) References Cited

U.S. PATENT DOCUMENTS

| | | | |
|---|---|---|---|
| 6,826,614 B1* | 11/2004 | Hanmann et al. | 709/227 |
| 6,892,067 B1* | 5/2005 | Sharma et al. | 455/419 |
| 6,980,826 B2 | 12/2005 | Yamaguchi | |
| 6,993,526 B2* | 1/2006 | Yamaguchi et al. | 1/1 |
| 7,065,341 B2* | 6/2006 | Kamiyama et al. | 455/411 |
| 7,079,839 B1* | 7/2006 | Papineau | 455/418 |
| 7,089,031 B1* | 8/2006 | Pedersen et al. | 455/550.1 |
| 7,333,802 B2* | 2/2008 | Moon | 455/414.2 |
| 7,398,055 B2* | 7/2008 | Tajima et al. | 455/41.2 |
| 7,551,888 B2* | 6/2009 | Kopra et al. | 455/3.05 |
| 8,126,989 B2* | 2/2012 | Lee | 709/219 |
| 2002/0015403 A1 | 2/2002 | McConnell et al. | |
| 2002/0049610 A1* | 4/2002 | Gropper | 705/1 |
| 2002/0049852 A1 | 4/2002 | Lee et al. | |
| 2002/0173294 A1* | 11/2002 | Nemeth et al. | 455/412 |
| 2002/0183059 A1* | 12/2002 | Noreen et al. | 455/427 |
| 2002/0194500 A1 | 12/2002 | Bajikar | |
| 2003/0028612 A1* | 2/2003 | Lin et al. | 709/217 |
| 2003/0069991 A1* | 4/2003 | Brescia | 709/245 |
| 2003/0078034 A1* | 4/2003 | Tsutsumi et al. | 455/412 |
| 2003/0120680 A1* | 6/2003 | Agrawal et al. | 707/103 R |
| 2003/0145011 A1* | 7/2003 | Su et al. | 707/100 |
| 2003/0212759 A1* | 11/2003 | Wu | 709/218 |
| 2004/0015403 A1* | 1/2004 | Moskowitz et al. | 705/26 |
| 2004/0037242 A1* | 2/2004 | Shi et al. | 370/329 |
| 2004/0038692 A1* | 2/2004 | Muzaffar | 455/502 |
| 2004/0098715 A1* | 5/2004 | Aghera et al. | 717/173 |
| 2004/0145604 A1* | 7/2004 | Min | 345/733 |
| 2005/0026636 A1* | 2/2005 | Yoon | 455/466 |
| 2005/0054286 A1* | 3/2005 | Kanjilal et al. | 455/3.05 |
| 2005/0071423 A1* | 3/2005 | Rajaniemi | 709/203 |
| 2005/0177419 A1* | 8/2005 | Choi et al. | 705/14 |
| 2005/0195221 A1* | 9/2005 | Berger et al. | 345/660 |
| 2005/0222908 A1* | 10/2005 | Altberg et al. | 705/14 |
| 2005/0287971 A1* | 12/2005 | Christensen et al. | 455/186.1 |
| 2007/0150903 A1* | 6/2007 | Hansen | 719/315 |

OTHER PUBLICATIONS

U.S. Appl. No. 10/811,314, filed Mar. 26, 2004, Pohja et al.
U.S. Appl. No. 10/612,706, filed Jul. 2, 2003, Mononen et al.

* cited by examiner

SYSTEM AND METHOD FOR THIRD PARTY SPECIFIED GENERATION OF WEB SERVER CONTENT

FIELD OF THE INVENTION

This invention relates in general to WEB servers, and more particularly, to personal WEB servers that provide Internet access to content generated through third party specification.

BACKGROUND OF THE INVENTION

The role of the mobile terminal in today's communications networks is rapidly becoming more and more integrated with the Internet model, as the mobile terminal adapts to user's demands for added functionality. The mobile terminal, for example, has evolved from a simple device offering voice only capability to a device fully capable of browsing the Internet and providing rich content communication to include voice, data, imaging, video, etc.

Many communication methods with mobile terminals currently require active user intervention. Specifically, today's mobile terminals essentially allow contact with the user of the mobile terminals through the use of voice or data calls, or through the use of various messaging technologies such as the Short Messaging Service (SMS) and Multimedia Messaging Service (MMS), each of which substantially requiring attention that is directly controlled and monitored by the user of the mobile terminal.

Generally speaking, user intervention is also required in order to obtain content from a personal communication terminal that may be of interest to other users operating within the network. In many cases, the problem is not that the user of the mobile terminal is unwilling to share content contained within the mobile terminal. The problem is, rather, that the user simply may not possess the knowledge that is necessary to make the content available. Such content may, nevertheless, be extremely useful to other users, if only they had access to it.

There exists, for example, a plethora of content contained within personal terminals that, to an increasing extent, could be made available to other users. For example, prior art mobile terminals having imaging capability, may have the ability to capture images that may be shared with others in the network. Additionally, prior art mobile terminals having proximity connection capability, such as through a Bluetooth or Wireless Local Area Network (WLAN) connection, may access content that is contained within devices that are in proximity to the mobile terminal and may likewise share that content with others in the network. Conventional personal terminals, however, require the content to be manually provided to each and every user in the network that may be interested.

Accordingly, there is a need in the communications industry for a system and method that allows automated access to content, contained locally within a personal terminal, that is facilitated through a third party specification.

SUMMARY OF THE INVENTION

To overcome limitations in the prior art, and to overcome other limitations that will become apparent upon reading and understanding the present specification, the present invention discloses a system and method for making content generated on personal terminals available through third party specification.

In accordance with one embodiment of the invention, a WEB server configuration system comprises a plurality of configuration entities interconnected via a network to provide configuration scripts and a mobile terminal coupled to the network that is adapted to receive a configuration script from the plurality of configuration entities. The mobile terminal is configured as a WEB server in response to executing one of the configuration scripts. The WEB server configuration system further comprises a browsing entity coupled to the network that is adapted to receive content from the mobile terminal. The content becomes visible to the browsing entity in response to the execution of the configuration script.

In accordance with another embodiment of the invention, a mobile terminal is capable of being wirelessly coupled to a network which includes a configuration element capable of uploading configuration scripts to the mobile terminal. The mobile terminal comprises a network interface capable of being coupled to receive the configuration scripts and is adapted to store the configuration scripts for subsequent execution. The mobile terminal further comprises a WEB server module that is coupled to access the configuration scripts and is adapted to execute the configuration scripts in response to an authorization signal. The mobile terminal further comprises a content storage container coupled to the WEB server module and is adapted to deliver content to the network in response to the authorization signal.

In accordance with another embodiment of the invention, a computer-readable medium having instructions stored thereon which are executable by a mobile terminal for facilitating local content transfer to network elements. The instructions perform steps comprising receiving scripts from a configuration entity of a network, executing the scripts to make the local content visible to the network, and granting access to the configuration entity to receive the local content from the mobile terminal in response to executing the scripts.

In accordance with another embodiment of the invention, a method of configuring a mobile terminal as a WEB server in a network comprises receiving configuration scripts from a configuration entity of the network, approving the configuration scripts for execution, and authorizing network access to local content contained within the mobile terminal in response to executing the configuration scripts.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
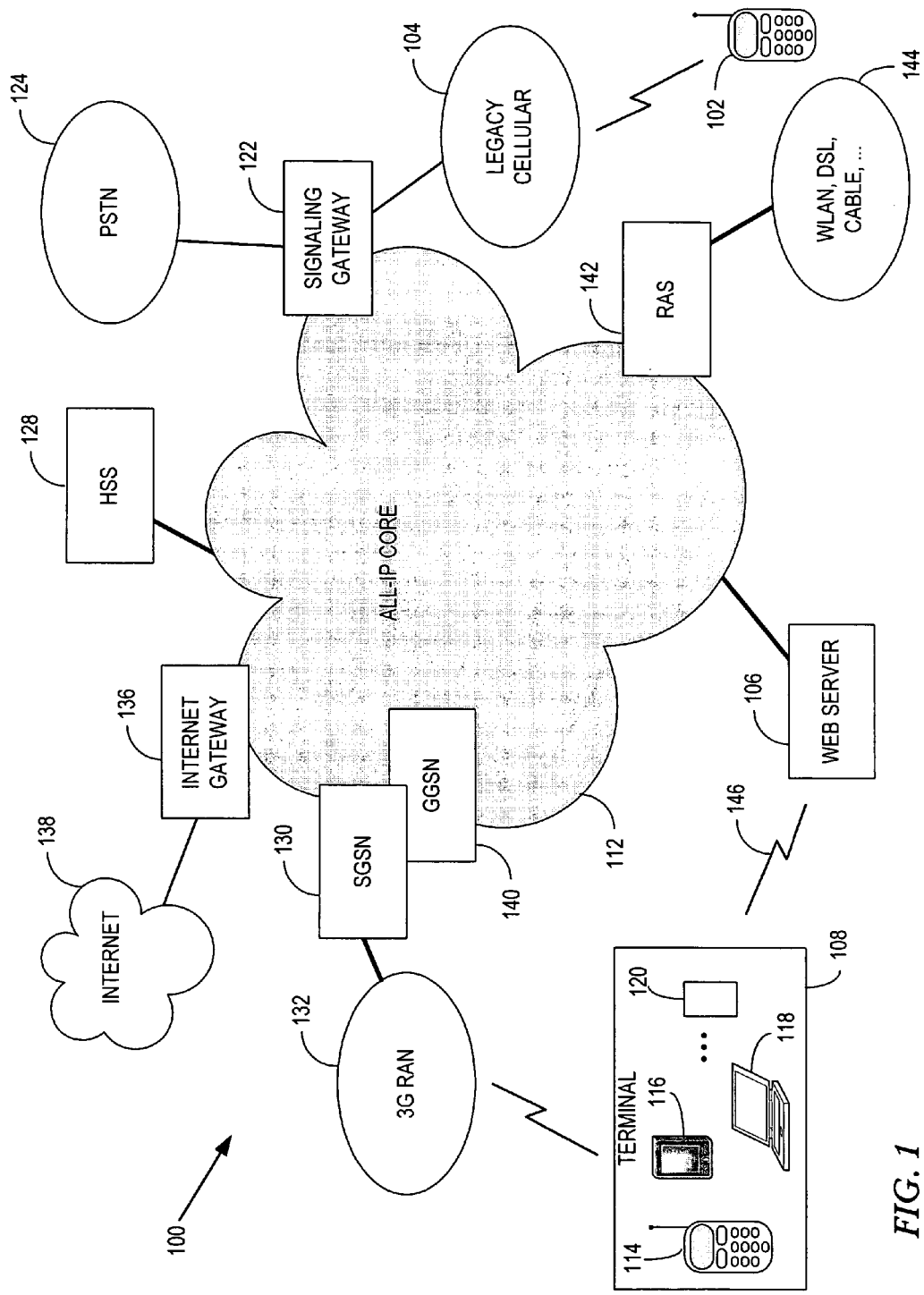
FIG. 1 illustrates and exemplary system architecture in accordance with the present invention.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system and method allowing a personal terminal, e.g., a mobile phone, Personal Digital Assistant (PDA), Personal Computer (PC), laptop computer, etc., to function as a personal WEB server. Such functionality is facilitated irregardless of the technical prowess, or interest, of the person using the personal terminal. Should the user of the personal terminal wish to make available to the World Wide Web (WWW) any local, or otherwise proximately coupled content, all the user need do is execute a previously uploaded WEB server script, which allows custom content access by the WWW as directed by the script.

Thus, in accordance with the present invention, the personal WEB server provides a mechanized content consumption model whereby content may be offered by the personal terminal with or without necessarily involving human interaction. Client systems interact with the personal WEB server using a model based on a rich set of metadata, made possible with an interpretable Extensible Markup Language (XML) such as the Extensible HyperText Markup Language (XHTML), or XHTML Mobile Profile. The transport is typically HyperText Transfer Protocol (HTTP), Wireless Application Protocol (WAP), or alternately, may be based upon the Simple Mail Transfer Protocol (SMTP). Accordingly, the personal WEB server is well suited for the ALL-Internet Protocol (IP) architecture for future ALL-IP networks, but may be equally well suited to function within legacy mobile communication systems such as the Global System for Mobile Communications (GSM), General Packet Radio Service (GPRS), and early Third Generation (3G) systems.

The Web content/services provided by the personal WEB server in accordance with the present invention provides services and content over the Internet and the Mobile domain to service/content consumers. Web services and content may be provided over a session layer, e.g., HTTP, SMTP, File Transfer Protocol (FTP), or other similar Internet technology. Web service and content provisioning utilizes certain industry standard software technologies, such as XML, XML Protocol (XMLP), Simple Object Access Protocol (SOAP), Web Services Description Language (WSDL), and Universal Description, Discovery, and Integration (UDDI). The Web content/services are not specific to any particular personal terminal platform and they are offered in a manner that allows: 1.) discovery of the mobile content/services offered by the personal WEB server; 2.) interpretation of the content/service offerings from a registry of content/services; and 3.) invocation of content/service requests with the appropriate request parameters that facilitates correct response interpretation.

An exemplary system level diagram of ALL-IP system 100 architecture in accordance with the present invention is illustrated in FIG. 1. ALL-IP core 112 provides the common, IP based signaling core utilized by system 100 to integrate various fixed, mobile, and Internet networks. ALL-IP core 112 allows all communication services to be carried over a single network infrastructure, thus enabling the integration of voice, data, and multimedia services. Further, ALL-IP core 112 allows network resources to be used more efficiently, where increased capacity may be deployed as necessary to meet demand. It should be noted that personal Web content/services offered in accordance with the present invention may be implemented through the use of IP enabled mobile terminals 108, but may also be implemented through the use of legacy mobile terminals 102 as well.

Mobile terminals 108 may represent any number of communication devices, such as cellular telephone 114, PDA 116, notebook or laptop computer 118, or any other type of wireless terminal represented by device 120. 3G Radio Access Network (RAN) 132 represents a combination of all mobile radio standards, such as GSM/Enhanced Data Rates for Global Evolution (EDGE) and Wideband Code Division Multiple Access (WCDMA). Each mobile radio standard having its own distinct network architectures and transport mechanisms that are fully integrated using the IP protocol, where Serving GPRS Support Node (SGSN) 130 and Gateway GPRS Support Node 140 provides the RAN interface to ALL-IP core 112.

Network 144 may provide WLAN, Digital Subscriber Line (DSL), and cable access to ALL-IP core 112 by Remote Access Server (RAS) 142. RAS 142 may include, for example, a Digital Subscriber Line Access Multiplexer (DSLAM) or a cable head end controller. To provide access to ALL-IP core 112 over a cable network, a head-end controller device (not shown) within RAS 142 connects to an IP router (not shown) that sends and receives the data from ALL-IP core 112. The controller interprets the data it receives from individual customers and keeps track of the services offered to each of them. The controller also modulates the data received from ALL-IP core 112 so that the head-end equipment can send it to a specific cable subscriber within network 144.

ALL-IP system 100 may support Legacy Cellular system 104 that offers communication support to non ALL-IP terminal 102, for example. Signaling gateway 122 performs all necessary Signaling System No. 7 (SS7) and Mobile Application Part (MAP) signaling conversions as necessary to provide SS7 over IP access from PSTN 124 and MAP over IP access from Legacy Cellular system 104 to ALL-IP core 112. In addition, signaling gateway 122 provides Short Message Service Center (SMSC) support and Multimedia Message Service Center (MMSC) support for any SMS and MMS operations as required by mobile terminal 102.

Internet 138 access from ALL-IP core 112 is provided through Internet gateway 136 to allow accesses defined by Uniform Resource Locator (URL) and Uniform Resource Identifier (URI) address definitions. Home Subscriber Server (HSS) 128 provides ALL-IP core 112 with the many database functions that are required in ALL-IP networks, including for example, Home Location Register (HLR) and Domain Name Server (DNS) operations.

WEB server 106 provides consumer applications and services that are not easily provided within the circuit switched or packet core networks by themselves. Service groups having major relevance in 3G ALL-IP networks include information and entertainment content providers, communication, productivity enhancing services, and business solutions. In particular, WEB server 106 may have scripting capability that allows uploading of executable scripts onto a personal mobile device, such as onto mobile terminal 108 or 102. The upload may take place through IP protocols facilitated by ALL-IP core 112, or conversely, may be uploaded via proximity connection 146, such as may be facilitated through a Bluetooth or InfraRed (IR) connection.

Generally, the present invention contemplates a personal WEB server, e.g., mobile terminal 108, that may be associated with either a proximity or non-proximity link, that allows the uploading of WEB server scripts from a configuration entity, e.g., WEB server 106. Once a script is uploaded to mobile terminal 108, a small icon, or equivalent audible/tactile indication, is presented to the user of mobile terminal 108 to indicate the presence of the newly uploaded script. At the user's discretion, the script may then be executed to activate an HTTP link, or similar IP associated link, which may then be accessed, subject to authentication in some instances, by any Internet browsing entity that may be operating within ALL-IP core 112. As such, mobile terminal 108 acts as a personal WEB server that provides content to requesting entities within ALL-IP core 112, where the content is either locally stored within mobile terminal 108, or otherwise fetched and then provided by mobile terminal 108. Further, the specific manner in which the content is provided is fully specified by the uploaded script, thus allowing the user to be completely removed from the personal WEB server facilitation process.

Figure 2:
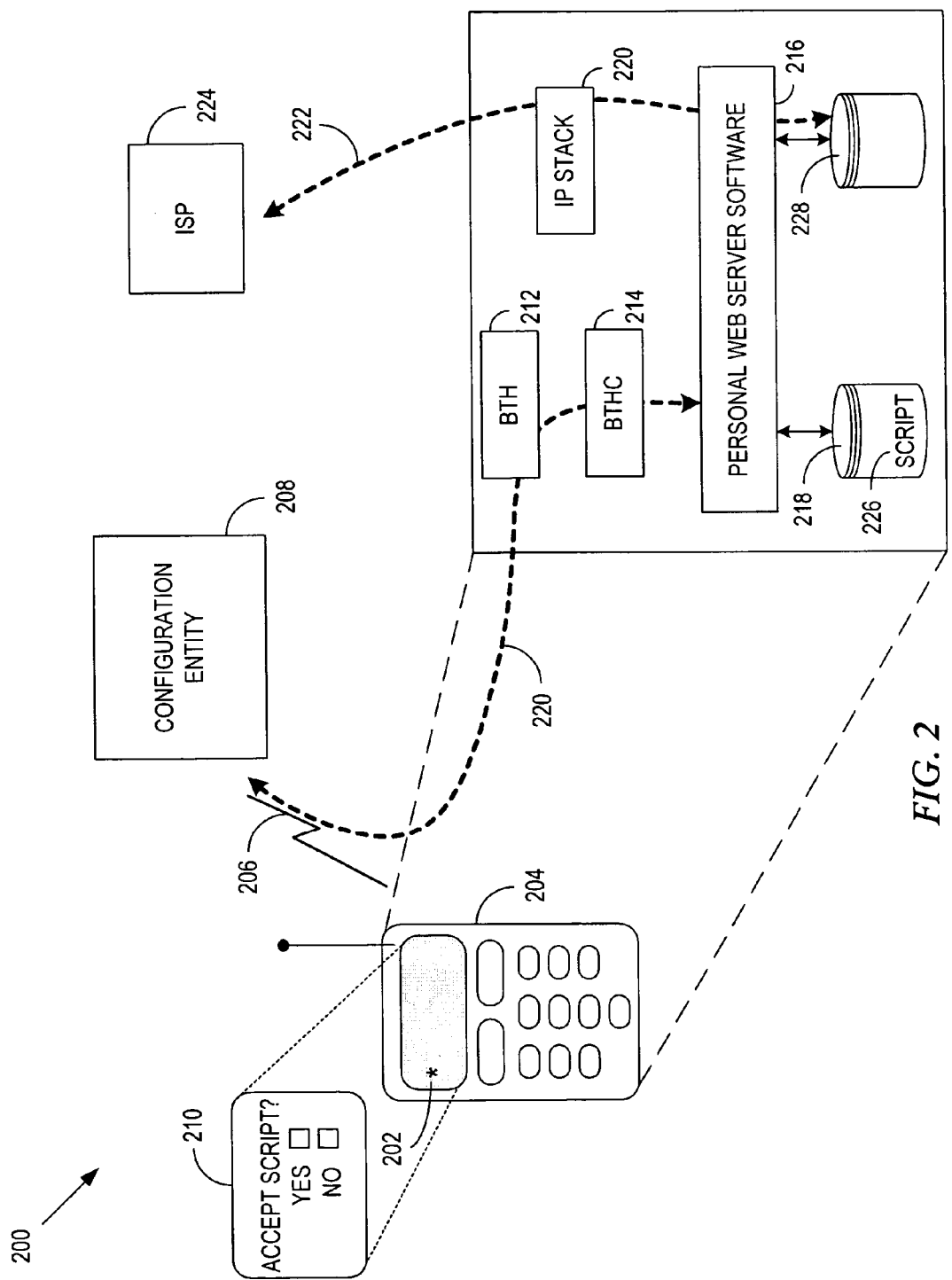
FIG. 2 illustrates an exemplary scripting diagram in accordance with the present invention.

In one embodiment according to the present invention, an exemplary scripting diagram 200 is presented in FIG. 2, which illustrates mobile terminal 204 as having, for example, Bluetooth capability to proximately connect to Bluetooth enabled configuration entity 208 via Bluetooth connection 206. Like many other communication technologies, Bluetooth is composed of a hierarchy of components that is formed into the Bluetooth communication stack. The Bluetooth communication stack may be broken into two main components: Bluetooth Host Controller (BTHC) 214 that provides the lower level of the stack; and Bluetooth Host (BTH) 212 to send or receive data over Bluetooth link 206 and to configure Bluetooth link 206. The Bluetooth communication stack may represent the lower communication layers that support any number of higher level application embodiments according to the present invention. In a first embodiment, for example, mobile terminal 204 may employ a Bluetooth communication stack to facilitate WEB server script transfers with configuration entity 208.

In particular, once mobile terminal 204 has come within an acceptable distance to configuration entity 208 so as to enable Bluetooth link 206, configuration entity 208 may initiate connection 220 with BTH 212, such that configuration entity 208 may deposit WEB server script 226 within script list storage location 218 of mobile terminal 204 via BTHC 214 and mobile server software block 216. Once script 226 is deposited, personal WEB server software block 216 then instantiates an indication that informs the user as to the presence of script 226 in script list storage location 218. In one embodiment, a visual indicator such as icon 202 may be used to provide such an indication, conversely or in addition to, an audible or tactile queue may be provided to the user of mobile terminal 204, should the user be occupied in a manner that precludes visual notification.

In any event, once the user of mobile terminal 204 has been apprised of the script upload, he or she may either confirm or deny acceptance of the script per script query 210. In order to aid the user in his or her determination, the user may first access information, either contained within script 226 or separately contained within an information file (not shown), that is also uploaded by configuration entity 208 and subsequently stored within script list storage location 218. Through access of the information file, the user may obtain additional information concerning script 226, such as an explanation of the operation of script 226, an identification of the author of script 226, an HTTP link to a WEB site containing further information concerning script 226, etc. If the user denies acceptance of script 226, then script 226 and its associated information file is removed from script list storage location 218 and no further action is taken. If, on the other hand, the user accepts script 226, then script 226 is activated to perform its assigned duties.

In an exemplary embodiment according to the present invention, script 226 may be a polling script uploaded by configuration entity 208 to obtain certain information concerning the location of the user of mobile terminal 204 and/or any specific activities engaged in by the user at his or her specific location. For example, the user of mobile terminal 204 may enter into a cinema that is currently playing a number of newly released movies, one of which the user intends to view. As the user passes through the doorway of the particular movie theater that is playing the movie, or in some other fashion comes within proximity to a configuration entity associated with that particular movie, the configuration entity detects the presence of mobile terminal 204 via Bluetooth connection 206 and uploads polling script 226 into script list storage location 218.

It should be noted that mobile terminal 204 may be recognized as a WEB server in a proximity context, whereby a-priori knowledge of mobile terminal 204 is not necessary. For example, once configuration entity 208 is instantiated with uploading capability enabled, WEB server scripts may be uploaded to the personal WEB server using a proximity connection, such as the Bluetooth connection discussed above, or conversely through use of the Internet via a particular HTTP link. The HTTP link, for example, may be expressed as "http://address//3rdparty/upload/script", where "address" is the address, or domain name, of the personal WEB server. The domain name may then be converted to an IP address using, for example, the DNS capability of HSS 128 of FIG. 1.

Figure 3A:
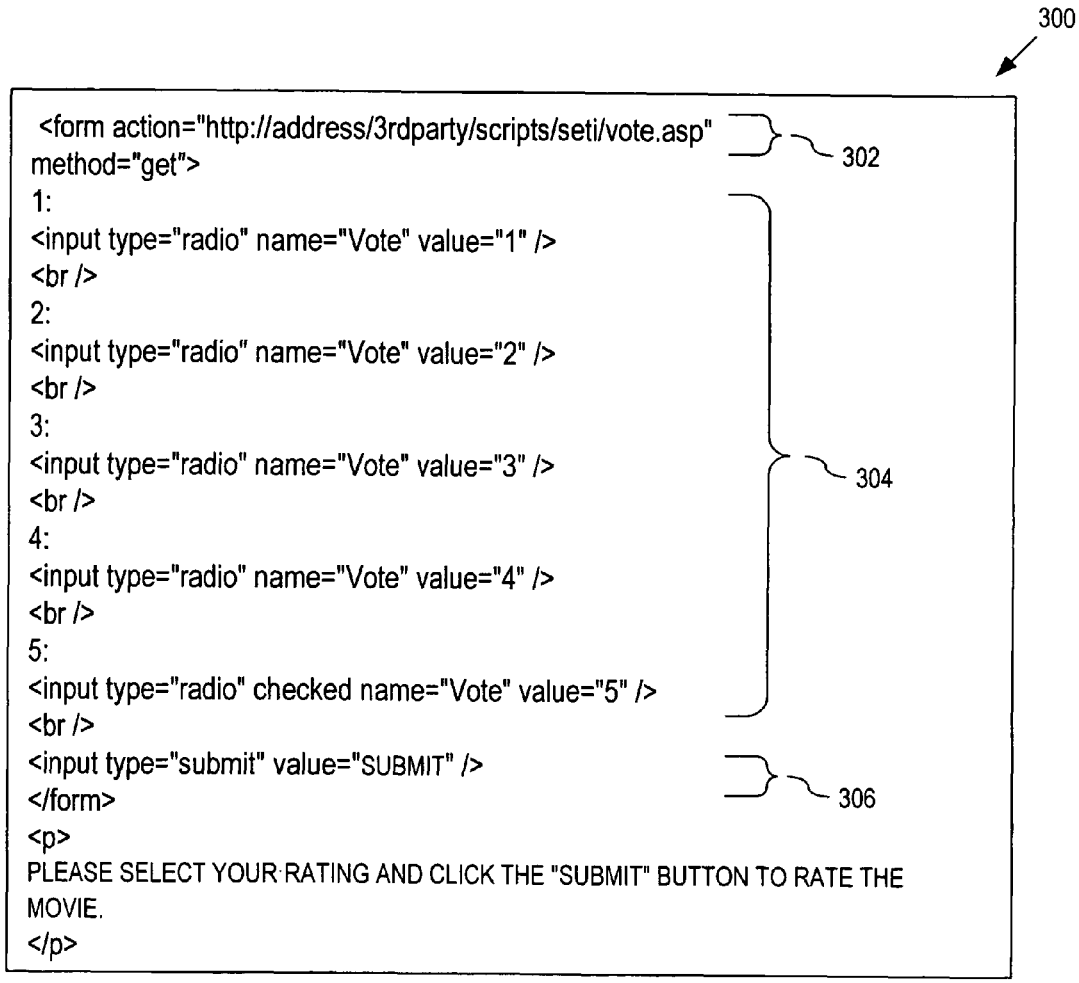
FIG. 3A illustrates an exemplary script to facilitate manual content generation in accordance with the present invention.
Figure 3B:
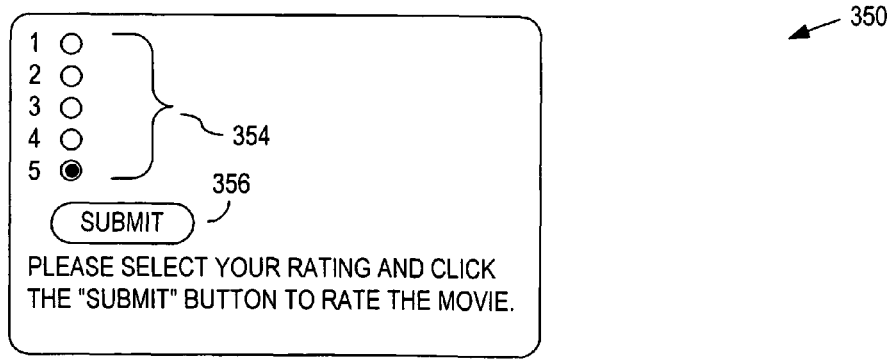
FIG. 3B illustrates an exemplary form generated by the script of FIG. 3A used for manual content generation in accordance with the present invention.

Polling script 300 of FIG. 3A represents an exemplary XHTML code segment that may be contained within script 226 of FIG. 2, that once executed, may instantiate a simple form dialog, e.g., 350 of FIG. 3B, on the display of mobile terminal 204. Attribute "action" of form tag 302, is used to select a URL that defines where to send any data that is produced by polling script 300. In particular, the originator of polling script 300 packages the script to partly specify where the results of the script should become visible within the WEB site name space. For example, polling script 300 specifies that its link should be "seti". Thus, a known prefix such as "3rdparty/scripts" may be used to form the complete link, e.g., "http://address/3rdparty/scripts/seti/vote.asp", which is then used by polling script 300 when submitting the results of the poll. In this way, the originator of polling script 300 may define the link to be browsed in order to obtain the results that polling script 300 produces.

After the movie, for example, the user of mobile terminal 204 notices the presence of icon 202 on his display, thus indicating the presence of polling script 300. After viewing the information file (not shown) that is associated with polling script 300, the user executes polling script 300, which instantiates form dialog 350 onto the display of mobile terminal 204. Code segment 304 defines movie ratings 354 that may be used by the user to rate the movie from 1-5, whereby a default value of, for example "5", has been selected to denote excellence. If the user agrees that the movie was excellent, he may leave the default value activated and then select submit button 356, as defined by code segment 306, to place his vote. If, on the other hand, the user wishes to change the rating to one of the other radio selections, then he may do so by clicking on one of the other radio buttons 354 before placing his vote.

In response to clicking submit button 356, the results of the voting may be placed into, for example, an Active Server Page (ASP) file, e.g., "vote.asp", as defined by form tag 302 for subsequent access by the originator of polling script 300. Alternately, the results of the query may be placed into any number of database formats, such as MS Access, DB2, Informix, MS SQL Server, Oracle, Sybase, etc. and subsequently accessed via a Structure Query Language (SQL). By similarly uploading polling script 300 onto other personal WEB servers, the originator of polling script 300 may then access the polling result files/databases of each of the other personal WEB servers to build statistics concerning each movie queried.

Automatic functions may also be executed within the personal WEB servers during, for example, idle periods, so as to minimize the computational impact on the personal WEB servers. For example, the user of mobile terminal 204 may have visited a SETI@phone project, whereby a client-server arrangement uses scripts that may be widely distributed among networked mobile terminals using an upload procedure as discussed above. The scripts, once executed, use spare computing time on the mobile terminals to perform tasks that involve analyzing portions of radio telescope signals that have been previously uploaded to the user's mobile terminal. The results of each script are returned to a storage location defined by the "action" attribute of the SETI (phone script and are then subsequently accessed by the SETI@phone script originator. The results of other mobile terminals similarly tasked may then be accessed and subsequently combined to complete the total signal analysis task.

In an alternate embodiment, metrics may be automatically obtained from each mobile terminal once a particular scripted function has been accepted by the user of the mobile terminal. For instance, the tourism board of a particular country may be interested in the travel habits of those who visit their country. As such, the tourism board may upload a tourist tracking script to the mobile phone of each tourist that comes within proximity to any one of the many tourist information centers located across the country. Once accepted, the uploaded tourist tracking script may periodically query a Global Positioning System (GPS) module, or similar location update module, located within each mobile terminal to obtain the GPS coordinates, or similar location coordinates, that are used to track the position of the mobile terminal. The periodically queried GPS coordinates are written to a storage location within the mobile terminal as directed by the tourist tracking script and subsequently accessed by the tourism board. In so doing, the tourism board is able to track how tourists are moving about their country with no explicit activity required by the tourist, apart from the tourist's initial acceptance of the tourist tracking script.

In an alternate embodiment, performance metrics may be automatically obtained from personal WEB servers in order to, for example, troubleshoot a technical problem with a newly released mobile terminal model having a particular range of International Mobile Station Equipment Identities (IMEI). In particular, an entity existent within Internet 138 may task 3G RAN 132 with uploading a test script to each of mobile terminals 108 having the IMEI, or range of IMEIs, that are suspected of anomalous operation. The test script, upon approval of its user, may then subject the mobile terminals to a battery of automated test procedures, the results of which may then be locally placed into a location defined by the WEB site name space as directed by the test script. At regular intervals, a WEB-bot may access the test results at the predetermined WEB site location and then compare the test results to a set of baseline results that are indicative of a normally operating mobile terminal. Any test results not conforming to the baseline are then identified by IMEI and recalled as necessary to correct the problem.

It should be noted that each of the personal WEB server scripts described above remain inactive until the user of the mobile terminal in receipt of the uploaded script has authorized its invocation. Until authorized, the uploaded script remains invisible to all entities within ALL-IP core 112, thus allowing the user full control as to whether or not to accept the script. In addition, once the script is invoked, it is executed within a sandbox environment, e.g., a protected and limited environment, which allows the script to run without causing risk of harm to the other components of the mobile terminal.

Figure 4:
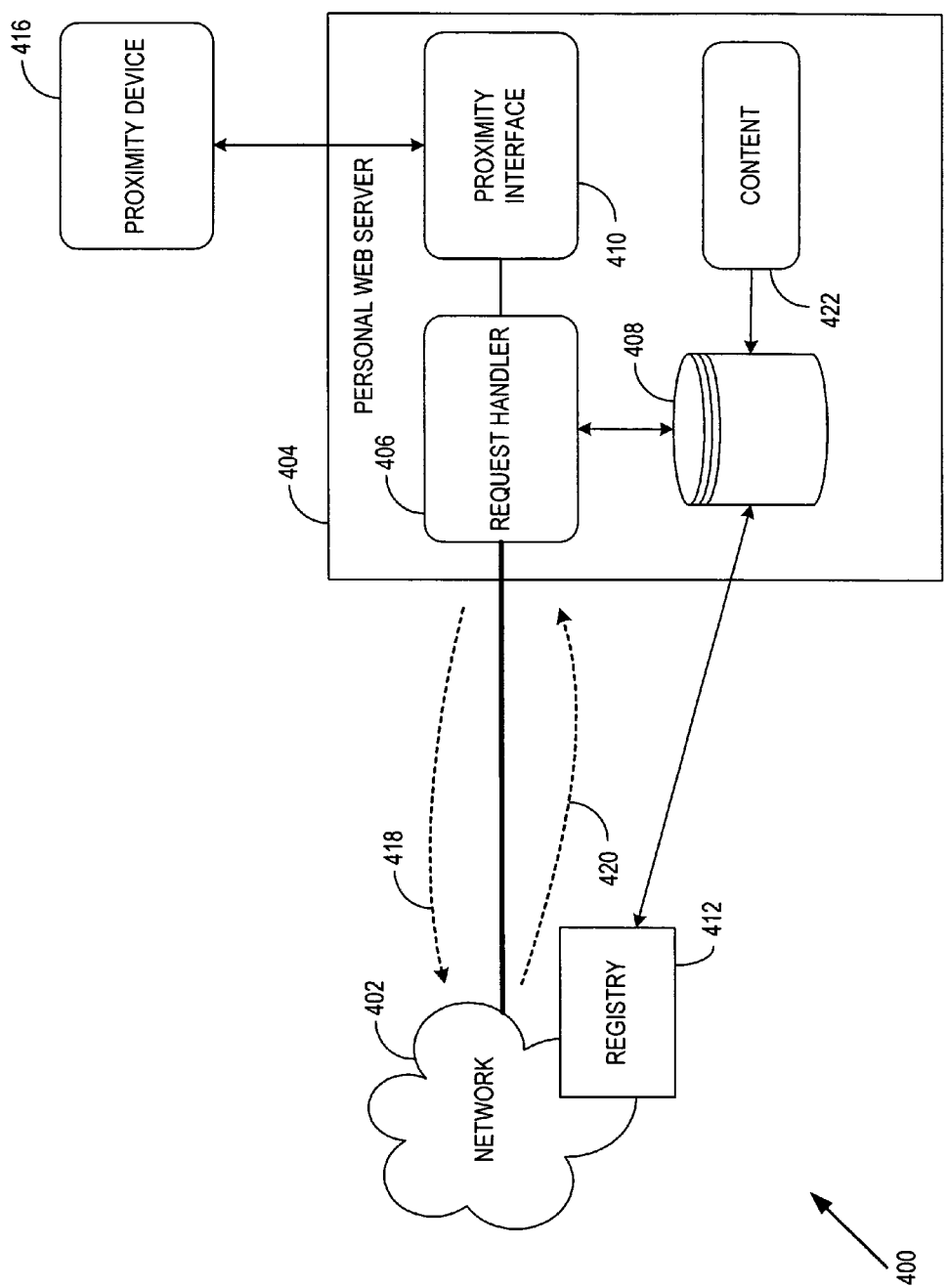
FIG. 4 illustrates an exemplary personal WEB server establishment diagram in accordance with the present invention.

In an alternate embodiment, the user of a mobile terminal may initiate a request to configure his or her mobile terminal into a personal WEB server according to the present invention. In such an instance, any services and/or content available within the mobile terminal, or proximately coupled to the mobile terminal, may be accessed by any requesting entity irregardless of the abilities of the user to establish such a personal WEB server. FIG. 4 illustrates exemplary personal WEB server establishment diagram 400, in which personal WEB server 404 is an ALL-IP mobile terminal as illustrated, for example, by mobile terminal 108 of FIG. 1. In addition, personal WEB server 404 may be capable of receiving executable uploads over-the-air, such as may be exemplified by a JAVA enabled device that is capable of receiving and executing applications called MIDlets, which when executed, facilitate the procedure of making content 422 and/or proximity device 416 available during Internet browsing sessions initiated from within network 402.

Content 422 may represent any local content contained within personal WEB server 404 that is to be provided to storage location 408 for subsequent network 402 access. Such local content may include image, video, and audio data as captured by the imaging capability (not shown) that may be integral to personal WEB server 404, or conversely, as received from proximity device 416 via proximity interface 410. In one embodiment, for example, content 422 may correspond to images of the birth of a first born child along with images of the child's first 6 months of life. The proud parents of the child, however, are the users of the mobile terminal and are unaware of the procedures to be taken to make the images available to any interested entities within network 402, such as family and friends.

Accordingly, a script request is transmitted on path 418 from request handler 406 on behalf of the user's wish to make the images available via network 402. In response, a MIDlet is received via path 420 from a configuration entity within network 402. The MIDlet received from path 420 may be, for example, an executable utility that first proceeds to query the user during an interactive interview, as to the nature of the content to be made available. The interview may consist of questions as to the storage location, i.e., path name, that is to be used to access content 422 from storage location 408 during network access. Further, the user may wish to make content 422 available only to those requesting entities having the appropriate security credentials, such as password and login name, thus the MIDlet queries the user as to the security level he or she wishes to impose upon the requesting entities.

Once the interview has been completed and all pertinent information has been ascertained as to the content and security to be provided, the MIDlet next advertises personal WEB server 404 with registry 412. Thus, Internet browsers contained within network 402 may perform discovery procedures to first locate and authenticate themselves with personal WEB server 404 and then link to the image data of the newborn previously identified by the user. It can be seen, therefore, that requested and non-requested scripting may be accomplished in accordance with the present invention to allow mobile terminals to operate as personal WEB servers in a variety of contexts to allow third parties to specify how content from the personal WEB servers is to be generated.

Figure 5:
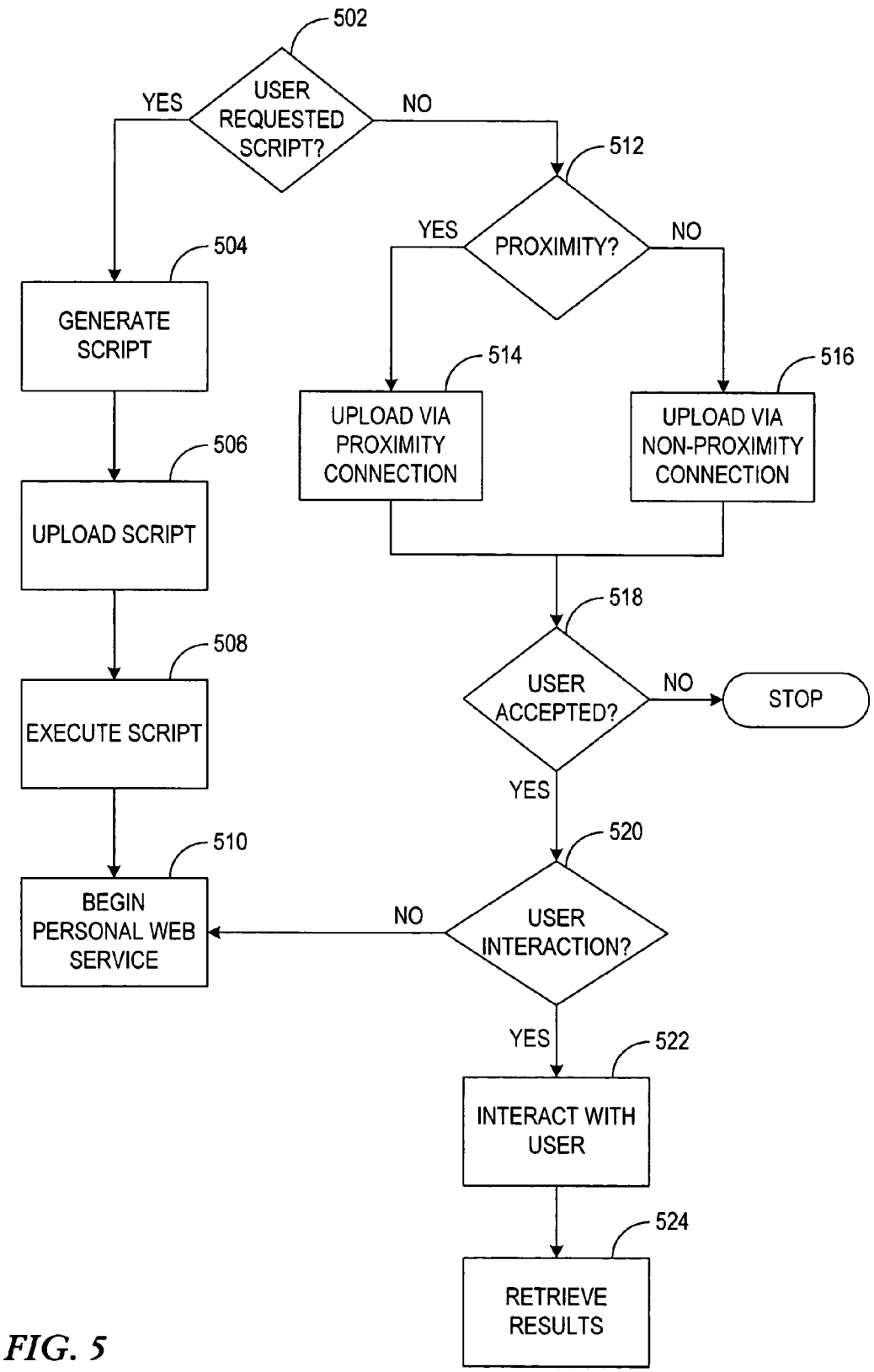
FIG. 5 illustrates a flow chart of an exemplary method in accordance with the present invention.

Turning now to flow chart 500 of FIG. 5, an exemplary method is illustrated in accordance with the present invention. In step 502, a determination is made as to whether the user of a mobile terminal wishes to specify content generation on the mobile terminal to be used as a personal WEB server as discussed above in relation to FIG. 4. If so, then the YES path of step 502 is taken. Otherwise, a third party initiates the process of uploading a script to the mobile terminal to enable the third party to specify content generation on the mobile terminal that is to be used as a personal WEB server, in which case the NO path of step 502 is taken. If user initiated, then the appropriate network entity generates the script as in step 504 that is necessary to properly interview the user of the mobile terminal as to the details of the content or service to be provided as discussed above in relation to FIG. 4. The script is then uploaded as in step 506 and executed as in step 508, whereby the necessary registry inputs are generated to allow browsing entities to discover and consume the content or services that the user wishes to supply. The personal WEB service or content may then commence to be supplied as in step 510.

If, on the other hand, a third party wishes to specify content generation on the personal WEB server, then step 512 determines whether the mobile terminal is within proximity range, e.g., via Bluetooth, WLAN, or IR, or if the mobile terminal is otherwise located. If proximately located, then the required script is uploaded to the mobile terminal via the appropriate proximity means as in step 514, or conversely, the script is uploaded via non-proximity means as in step 516. In either case, user acceptance must be granted as determined in step 518, otherwise the third party specified content generation method is terminated.

If the user accepts the script, then the script's action either requires user interaction to generate the content as determined in step 520, or the script operates automatically without the user's interaction to generate the content. If user interaction is required, then step 522 is executed to interact with the user, as discussed for example in relation to FIGS. 3A and 3B, to generate the content. The results of the user generated content is then retrieved from within the personal WEB server as in step 524. If user interaction is not required, then the script executes automatically to generate the necessary content or service as required in step 510.

Figure 6:
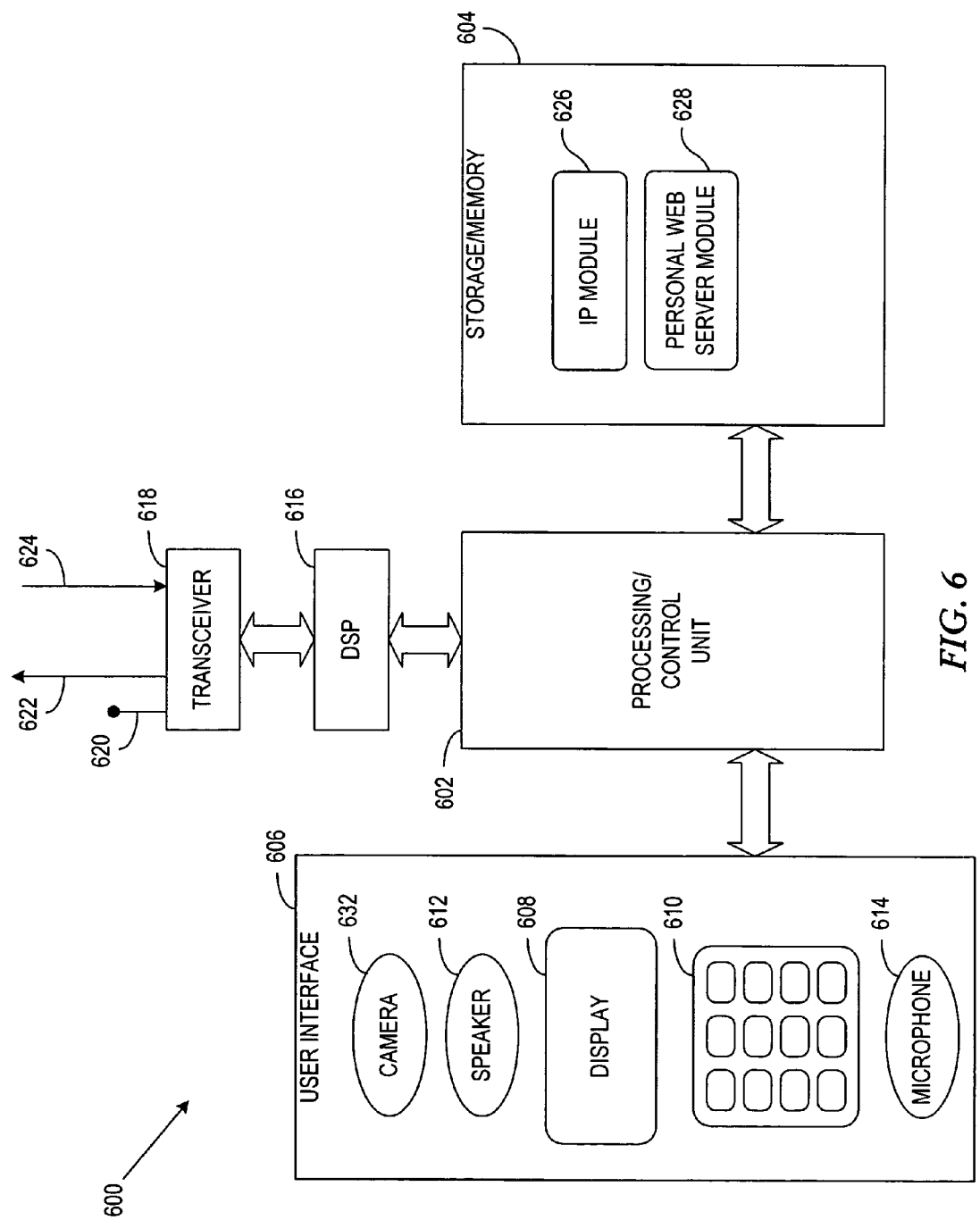
FIG. 6 illustrates a representative mobile computing arrangement suitable for performing personal WEB server functions in accordance with the present invention.

The invention is a modular invention, whereby processing functions within a mobile terminal may be utilized to implement the present invention. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various personal WEB server functions described herein. An example of a representative mobile terminal computing system capable of carrying out operations in accordance with the invention is illustrated in FIG. 6. Those skilled in the art will appreciate that the exemplary mobile computing environment 600 is merely representative of general functions that may be associated with such mobile devices, and also that landline computing systems similarly include computing circuitry to perform such operations.

The exemplary mobile computing arrangement 600 suitable for implementing personal server functions in accordance with the present invention may be associated with a number of different types of wireless devices. The representative mobile computing arrangement 600 includes a processing/control unit 602, such as a microprocessor, reduced instruction set computer (RISC), or other central processing module. The processing unit 602 need not be a single device, and may include one or more processors. For example, the processing unit may include a master processor and associated slave processors coupled to communicate with the master processor.

The processing unit 602 controls the basic functions of the mobile terminal, and also those functions associated with the present invention as dictated by IP module 626 and personal WEB server module 628 available in the program storage/memory 604. Thus, the processing unit 602 is capable of generating and making available personal WEB server content to requesting client terminals via IP protocols implemented by IP module 626 pursuant to instructions provided by personal WEB server module 628. The program storage/memory 604 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the present invention, the program modules associated with the storage/memory 604 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The processor 602 is also coupled to user-interface 606 elements associated with the mobile terminal. The user-interface 606 of the mobile terminal may include, for example, a display 608 such as a liquid crystal display, a keypad 610, speaker 612, internal camera 632, and microphone 614. These and other user-interface components are coupled to the processor 602 as is known in the art. Other user-interface mechanisms may be employed, such as voice commands, switches, touch pad/screen, graphical user interface using a pointing device, trackball, joystick, or any other user interface mechanisms.

The mobile computing arrangement 600 also includes conventional circuitry for performing wireless transmissions. A digital signal processor (DSP) 616 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 618, generally coupled to an antenna 620, transmits the outgoing radio signals 622 and receives the incoming radio signals 624 associated with the wireless device.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a personal WEB server system and method in accordance with the present invention.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
   determining to store content to a memory associated with a mobile terminal;
   receiving at the mobile terminal, a script for making the content network accessible;
   executing the script; and
   generating, in response to executing the script, a request for advertising the content as available at a designated name space corresponding to the mobile terminal,
   wherein the content is provided to requesting entities by the mobile terminal.

2. A method according to claim 1, wherein executing the script, the mobile terminal is configured for automated transmission of the content, the method further comprising:
   receiving at the mobile terminal, a request for the content from a requesting entity; and
   determining to transmit, automatically, from the mobile terminal, the content to the requesting entity in response to receiving the request for the content.

3. A method according to claim 1, further comprising:
   determining to present one or more options to a user associated with the mobile terminal in response to executing the script,
   wherein the one or more options relate to enabling the content to be network accessible.

4. A method according to claim 1, further comprising:
   receiving authorization from a user associated with the mobile terminal to enable the script to be executed.

5. A method according to claim 1, wherein the script is received over a proximity-based connection.

6. A method according to claim 1, wherein the script is received in response to a user request for the script.

7. A method according to claim 1, wherein the content is generated by the mobile terminal in response to executing the script.

8. An apparatus comprising:
   at least one processor; and
   at least one memory including computer program code, the at least one memory and the computer program code being configured to, with the at least one processor, cause the apparatus at least to:
      determine to store content to the at least one memory associated with the apparatus,
      receive a script for making the content network accessible,
      execute the script, and
      generate, in response to executing the script, a request for advertising the content as available at a designated name space corresponding to the apparatus,
   wherein the content is provided to requesting entities by the apparatus.

9. An apparatus according to claim 8, wherein executing the script, the apparatus is configured for automated transmission of the content, the at least one memory and the computer program code being further configured to, with the at least one processor, cause the apparatus at least to:
   receive a request for the content from a requesting entity; and
   determine to transmit, automatically, the content to the requesting entity in response to receiving the request for the content.

10. An apparatus according to claim 8, wherein the at least one memory and the computer program code are further configured to, with the at least one processor, cause the apparatus at least to:
   determine to present, in response to executing the script, one or more options to a user associated with the apparatus,
   wherein the one or more options relate to enabling the content to be network accessible.

11. An apparatus according to claim 8, wherein the at least one memory and the computer program code are further configured to, with the at least one processor, cause the apparatus at least to:
   receive authorization from a user associated with the apparatus to enable the script to be executed.

12. An apparatus according to claim 8, wherein the script is received over a proximity-based connection.

13. An apparatus according to claim 8, wherein the script is received in response to a user request for the script.

14. An apparatus according to claim 8, wherein the content is generated by the apparatus in response to executing the script.

15. A method comprising:
  receiving a request for script generation;
  generating, in response to the request, a script for causing a mobile terminal to make content network accessible; and
  determining to transmit the script to the mobile terminal,
  wherein the content is advertised as network accessible to requesting entities at a designated name space corresponding to the mobile terminal.

16. A method according to claim 15, further comprising:
  detecting proximity of the mobile terminal via a proximity context,
  wherein the request for script generation is received in response to detecting the proximity of the mobile terminal.

17. A method according to claim 16, wherein the script is determined to be transmitted to the mobile terminal over a proximity connection associated with the proximity context.

18. A method according to claim 15, wherein the request for script generation is received from the mobile terminal.

19. An apparatus comprising:
  at least one processor; and
  at least one memory including computer program code, the at least one memory and the computer program code being configured to, with the at least one processor, cause the apparatus at least to:
    receive a request for script generation,
    generate, in response to the request, a script for causing a mobile terminal to make content network accessible, and
    determine to transmit the script to the mobile terminal,
    wherein the content is advertised as network accessible to requesting entities at a designated name space corresponding to the mobile terminal.

20. An apparatus according to claim 19, wherein the at least one memory and the computer program code are further configured to, with the at least one processor, cause the apparatus at least to:
  detect proximity of the mobile terminal via a proximity context,
  wherein the request for script generation is received in response to detecting the proximity of the mobile terminal.

21. An apparatus according to claim 20, wherein the script is determined to be transmitted to the mobile terminal over a proximity connection associated with the proximity context.

22. An apparatus according to claim 21, wherein the proximity connection is a Bluetooth connection.

23. An apparatus according to claim 19, wherein the request for script generation is received from the mobile terminal.

* * * * *